(12) United States Patent
Muench-Casanova et al.

(10) Patent No.: US 7,757,258 B2
(45) Date of Patent: Jul. 13, 2010

(54) SYSTEM FOR CONTROLLING DISPLAY AND OPERATION OF SIMULTANEOUS TRANSMISSIONS OF AT LEAST TWO MEDIA

(75) Inventors: Stephen L Muench-Casanova, Rochester, MI (US); David J Jaworski, Bloomfield, MI (US); Michael S. Patterson, Macomb, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 793 days.

(21) Appl. No.: 11/184,203

(22) Filed: Jul. 19, 2005

(65) Prior Publication Data

US 2007/0022448 A1 Jan. 25, 2007

(51) Int. Cl.
*H04N 7/18* (2006.01)

(52) U.S. Cl. ............... 725/75; 725/76; 725/77; 725/78; 725/74

(58) Field of Classification Search ............... 725/74–76
See application file for complete search history.

(56) References Cited

U.S. PATENT DOCUMENTS

| | | | |
|---|---|---|---|
| 5,309,556 A | 5/1994 | Sismilich | |
| 5,689,663 A | 11/1997 | Williams | |
| 5,867,223 A | 2/1999 | Schindler et al. | |
| 6,678,892 B1 * | 1/2004 | Lavelle et al. | 725/75 |
| 6,731,310 B2 | 5/2004 | Craycroft et al. | |
| 6,762,773 B2 | 7/2004 | Kolde et al. | |
| 6,823,225 B1 | 11/2004 | Sass | |
| 2004/0073932 A1 | 4/2004 | Lavelle et al. | |
| 2005/0005298 A1 | 1/2005 | Tranchina | |
| 2005/0251833 A1 * | 11/2005 | Schedivy | 725/77 |
| 2007/0288958 A1 * | 12/2007 | Knudson et al. | 725/39 |

* cited by examiner

*Primary Examiner*—Joseph P Hirl
*Assistant Examiner*—Fred Peng
(74) *Attorney, Agent, or Firm*—Ralph E. Smith

(57) ABSTRACT

A system for controlling display and operation of simultaneous transmissions of at least two media includes an entertainment unit capable of transmitting at least two media simultaneously. A wireless interface device is used to select a first and second media from the at least two media. A display device in electrical communication with the entertainment unit receives and displays a video portion associated with each of the first and second selected media. At least two wireless receivers are provided for receiving an audio portion associated with each of the first and second media. The wireless interface device is further provided for independently controlling operation of each of the first and second media.

13 Claims, 3 Drawing Sheets

SYSTEM FOR CONTROLLING DISPLAY AND OPERATION OF SIMULTANEOUS TRANSMISSIONS OF AT LEAST TWO MEDIA

FIELD OF THE INVENTION

The present invention relates to multimedia entertainment systems in a vehicle and, more particularly, to an apparatus capable of controlling display and operation of at least two media programs transmitted simultaneously by the multimedia entertainment system.

BACKGROUND OF THE INVENTION

Multi-media systems have been recently made available in which multiple media programs, such as video and radio, can run simultaneously so that a user can watch a video while at the same time listen to a radio program or so that one user can watch a video while another user can watch a different video or listen to a radio program. Such systems are typically available on an airplane or in a home environment.

In an airplane environment, a passenger is limited in his/her media program selection to only those being offered in the airplane, which typically includes one preselected movie and one or two preselected audio, or radio, programs. The passenger listens to his/her selection by tuning to the appropriate channel associated with his/her media selector. There is no ability to select a program not already preselected or to control the operation of the selected program, other than the volume.

In a home environment, a user is only limited in his/her media program selection to his/her collection. In this instance a user is able to select any one of several media programs and can control each of them to his/her liking. However, each media program is typically controlled via a separate controller or manually. There is no common display for all the media programs available for selection.

In an automobile environment, due to limited space it has generally been the case that only one particular type of media can be played at a given time in a given vehicle. For example, only one movie may be played at a given time in a given vehicle, and such playback is to the exclusion of any other media sources such as, e.g., the radio. This is true for a variety of reasons. One such reason is that the movie playing device, e.g., DVD player, is typically coupled to the existing speaker system of the vehicle, thus allowing only one media source to be played back through the speakers at any given time. Another such reason is that it is difficult for a person to follow the play back of a particular audio media source when another audio media source is simultaneously being played back.

Accordingly, there is a need for a multimedia entertainment unit for a vehicle that allows for a plurality of passengers to each watch and/or listen to a different media while allowing independent control of each of the selected media.

SUMMARY OF THE INVENTION

A system for controlling display and operation of simultaneous transmissions of at least two media includes an entertainment unit capable of transmitting at least two media simultaneously. A wireless interface device is used to select a first and second media from the at least two media. A display device in electrical communication with the entertainment unit receives and displays a video portion associated with each of the first and second selected media. At least two wireless receivers are provided for receiving and broadcasting an audio portion associated with each of the first and second media. The wireless interface device is further provided for independently controlling operation of each of the first and second media.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
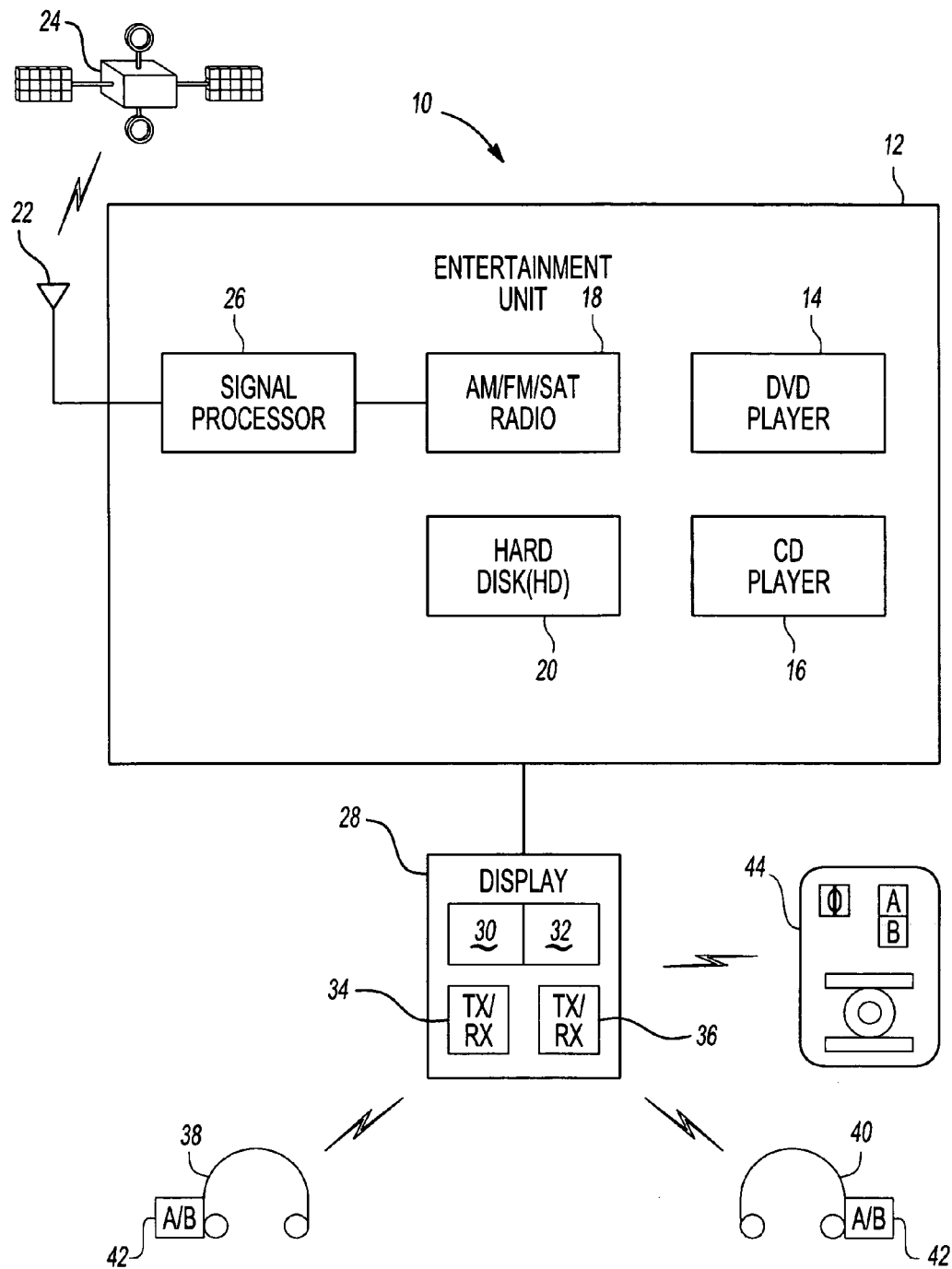
FIG. 1 is a representation, in block diagram form, of a preferred embodiment of a system according to the present invention.

FIG. 1 is a block diagram illustrating the system 10 of the present invention. The system 10 includes an entertainment unit 12 installed in a vehicle and includes circuitry and software to process signals and transmit audio and/or video signals associated with any one of multiple media, such as a digital video disk (DVD) player 14, a compact disk (CD) player 16, an amplitude modulation/frequency modulation/satellite (AM/FM/SAT) radio 18, and a hard disk drive (HD) 20. It is to be appreciated that the media devices described above are merely illustrative and, thus, other media devices may also be employed in accordance with the invention, while maintaining the spirit and scope thereof.

An antenna 22 may be located within the entertainment unit 12 or may more likely be located external thereto as shown in FIG. 1. For example, antenna 22 may be the original antenna included in the vehicle, which is typically used to receive frequencies associated with AM/FM radio stations. Such an antenna is typically located in the windshield or protruding from the exterior of the vehicle. Moreover, antenna 22 may be a special purpose antenna, capable of receiving frequencies corresponding to, for example, satellite communications from a satellite 24. The satellite communications may include movies and other media types (e.g., music). In any event, the antenna 22 is coupled to the AM/FM/SAT radio 18 of the entertainment unit 12. If satellite or other communication is desired, the antenna would likely be coupled to a signal processor 26 which would perform functions such as demodulating, signal discrimination, and signal splitting.

Coupled to the entertainment unit 12 is a display device 28 having a first screen portion 30 and a second screen portion 32. The video signal associated with DVD player 14 and/or audio signal associated with CD player 16, AM/FM/SAT radio 18 and HD 20 are displayed on first and second screen portions 30, 32, as described in greater detail below.

The display device 28 further includes a first wireless transceiver 34 and a second wireless transceiver 36. The transceivers 34, 36 transmit the audio associated with the selected media to a first wireless headset 38 and a second wireless headset 40. It is to be appreciated that while the illustrative embodiment of FIG. 1 is shown with the transceivers 34, 36 housed in the display device 28, the invention is not so limited, and the transceivers 34, 36 could be housed in the entertainment unit 12. It is also to be appreciated that while the illustrative embodiment of FIG. 1 is shown with two wireless headsets, i.e., 38, 40, the invention again is not so limited and, thus, any number of wireless headsets may be used in conjunction with the invention.

The audio associated with the selected media is transmitted to the headsets 38, 40 via first and second wireless signals. The wireless signals can be any type of wireless signal including, but not limited to, radio frequency and infrared signals.

In operation, the audio portion of the first selected media is transmitted wirelessly at a first frequency for receipt by the headsets 38, 40. The audio portion of the second selected media is transmitted wirelessly at a second frequency for receipt by the headsets 38, 40. If the DVD Player 14, or any other media having video associated therewith, is selected, the video portion is sent to the display 28. The user of the headsets 38, 40 chooses which audio program to listen to via selector switch 42 associated with each headset 38, 40. Thus, if the user switches to the first frequency, or channel A, then the user has just tuned to the audio portion being transmitted by first transceiver 34. If the user switches to the second frequency, or channel B, then the user has just tuned to the audio portion being transmitted by second transceiver 36. Each of the headsets 38, 40, however, could be tuned to the same frequency or channel, if desired.

Figure 2:
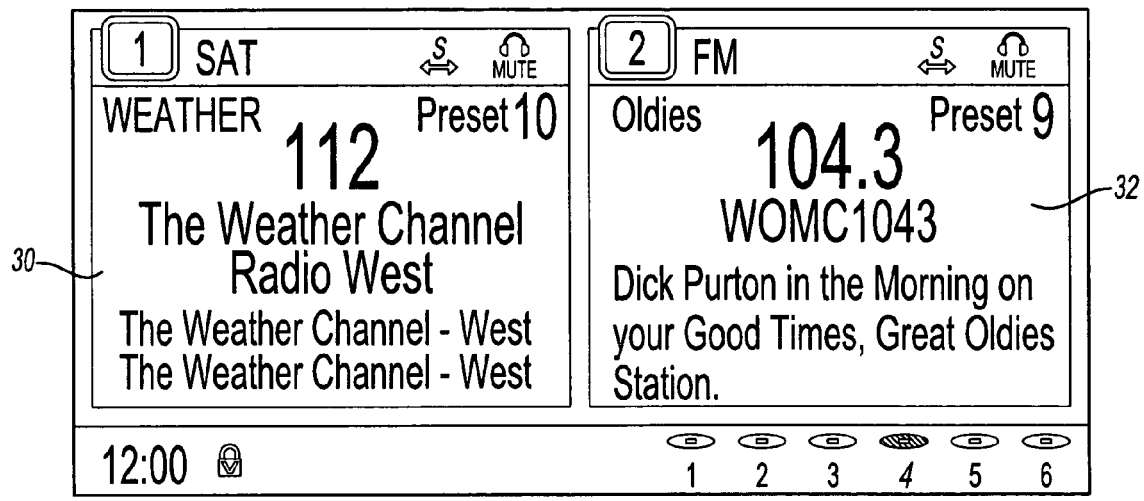
FIG. 2 is a representation of a display according to the present invention in which simultaneous media are displayed.
Figure 3:
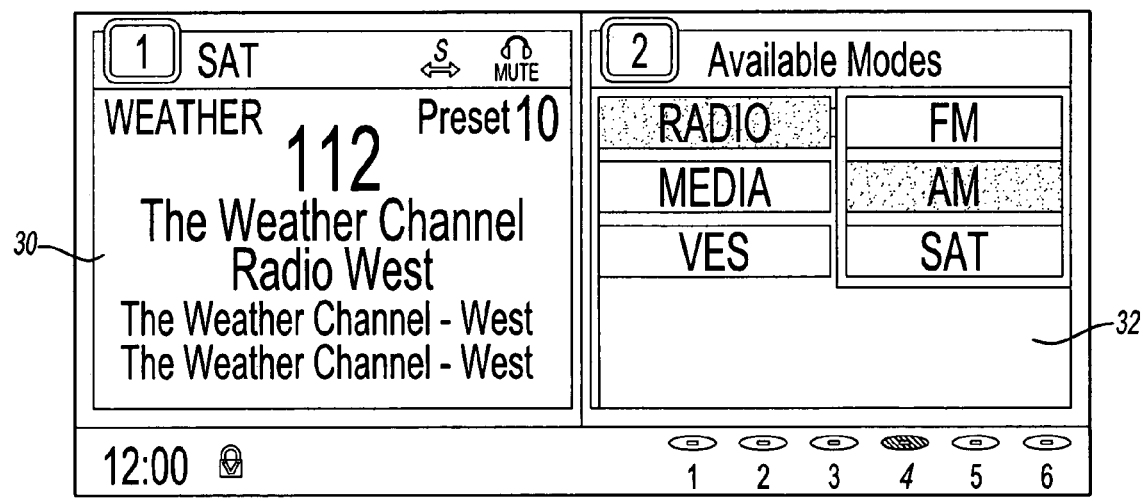
FIG. 3 is a representation of a display according to the present invention illustrating the selection of a second media source.

Media selection and control is done via a wireless interface device 44, or handheld remote control device. By using the remote control device 44, a user selects which media is to be transmitted via first and second transceivers 34, 36. A user would select "A" on the remote control device 44, and then select which media should be transmitted wirelessly on channel A. Once selected, the audio portion of the first selected media is wirelessly transmitted over channel A for receipt by either headset 38, 40 that is tuned to channel A. Corresponding control or data information associated with the first selected media is displayed on first screen portion 30, as shown in FIGS. 2-3. Furthermore, remote control device 44 is also used for controlling operation of the selected media, such as volume, radio channel, track number, etc.

When channel B is selected via the remote control device 44, the second media can then be selected and/or controlled. The media is transmitted via second transceiver 36 and the corresponding audio portion is wirelessly transmitted on channel B for receipt by either headset 38, 40. The second media selection is displayed on the second screen portion 32 of the display 28, as shown in FIG. 2. Once a second media is selected, a user can switch between the two selected media via selector switch 42 on his/her headset 38, 40, or change one of the selections by selecting a different media.

FIG. 3 illustrates the type of information that can be displayed on the second screen portion 32 when selecting the second media, i.e., the available modes or media. After the two media are selected, the type of information displayed on each of the screen portions 30, 32 include channel number, mode (i.e., AM/FM, Satellite, CD, DVD, HD, etc.), headset status (i.e., muted or unmated), radio/satellite station information, radio/satellite station, preset number, disc type, disc track/chapter, disc elapsed time, disc/satellite song title, artist and/or album.

Figure 4:
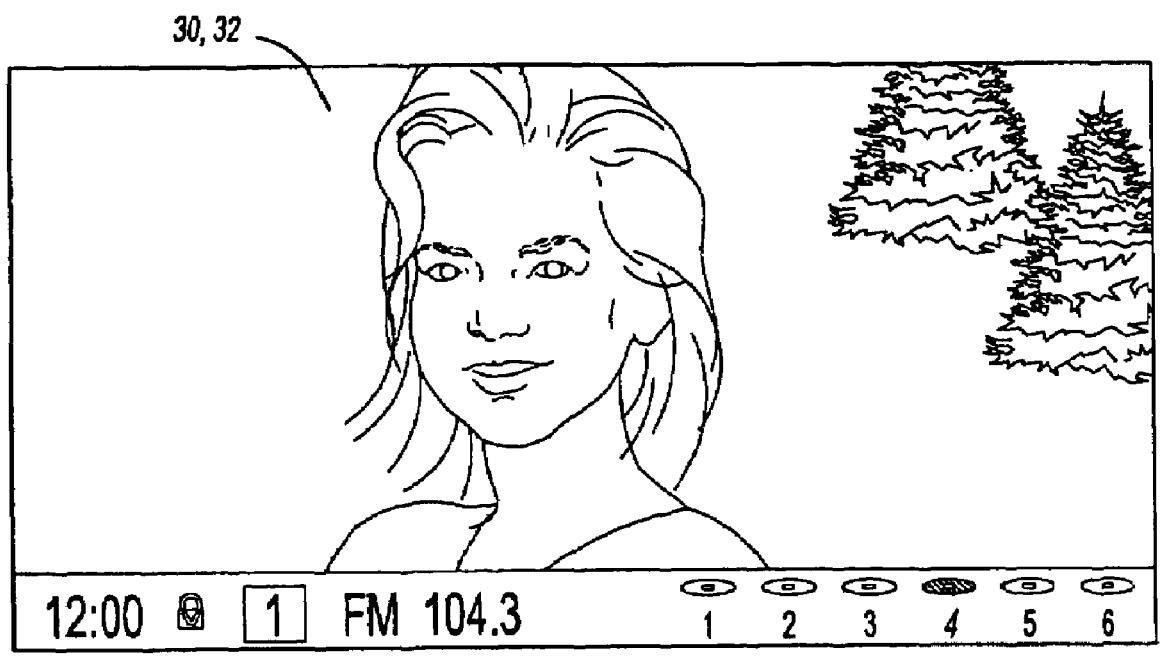
FIG. 4 is a representation of a display according to the present invention illustration the simultaneous display of a video media and an audio media.

If a movie is one of the media selected, the video portion is displayed across the entire display 28, rather than being split onto one of the first and second screen portions 30, 32. Information associated with the second selected media is then displayed as an overlay at the bottom, as shown in FIG. 4, or at the top of the screen 28.

In the preferred embodiment, each screen portion 30, 32 displays information on the perimeter below the split screen channel layout, such as time, parental control status (i.e., locked or unlocked), error messages, and status of discs within a radio 6-disc changer.

Thus, the invention allows a plurality of passengers in the vehicle to watch and/or listen to a different media program. The description of the invention is merely exemplary in nature and, thus, variations that do not depart from the gist of the invention are intended to be within the scope of the invention. Such variations are not to be regarded as a departure from the spirit and scope of the invention. For example, it is to be understood that some of the elements shown in FIG. 1 may be included in the entertainment unit 12 or they may be separate from the entertainment unit 12 but nonetheless intended to interact with the entertainment unit 12.

What is claimed is:

1. A system for controlling display and operation of simultaneous transmissions of at least two media, the system comprising:

an entertainment unit capable of transmitting at least two media simultaneously;

a wireless interface device configured to enable selection of a first and second media from the at least two media remotely of the entertainment unit, the wireless interface device having a first onboard selector enabling transmission of a first selection signal selecting the first media and enabling control thereof and a second onboard selector enabling transmission of a second selection signal selecting the second media and enabling control thereof;

a display device in electrical communication with the entertainment unit for receiving and displaying a video portion associated with each of the first and second media that comprises (a) display of one of (1) data information related to the media selection of the first media and (2) control information comprised of a menu, that includes available selectable modes for radio and media on a first portion of the screen and (b) display of one of (1) data information related to the media selection of the first media and (2) control information comprised of a menu that includes available selectable modes for radio and media on a second portion of the screen;

at least one transceiver in electrical communication with the entertainment unit and the display device, the at least one transceiver receiving a first selection signal from the wireless interface device selecting the first media and transmitting an audio portion of the first media at the first predetermined wireless frequency, and the at least one transceiver receiving a second selection signal from the wireless interface device selecting the second media and transmitting an audio portion of the second media at the second predetermined wireless frequency;

a plurality of headphones that each comprises at least one wireless audio receiver capable of receiving an audio portion associated with each of the first and second media and an onboard selector switch enabling selection of the wirelessly transmitted audio portion of one of the first and second media to receive and audibly reproduce; and wherein the wireless interface device is further configured for independently controlling operation of each of the first and second media enabling control of volume, radio channel or track number of the media selected for the first and second media;

wherein the display device has first and second screen portions, the first screen portion for displaying the video portion associated with the first media and the second screen portion for displaying the video portion associated with the second media, wherein the first and second screen portions are configurable to a single continuous display to display only one of the first and second media when the one of the first and second media comprises a predetermined media type.

2. The system as recited in claim 1, wherein the data information that is displayable on the first and second screen portions includes a first descriptor descriptive of the type of the first media and a second descriptor descriptive of the content of the first media displayed on the first screen portion and includes a first descriptor descriptive of the type of the second media and a second descriptor descriptive of the content of the second media displayed an the second screen portion.

3. The system as recited in claim 1, wherein the predetermined media type comprises one of a video program, a video movie, or a video game.

4. The system as recited in claim 1, wherein an indicia indicative of the other one of the first and second media is displayed as an overlay at one of a top and bottom portion of the single continuous display.

5. The system as recited in claim 1, wherein the wireless interface device is a handheld remote control device.

6. The system as recited in claim 1, wherein the at least two media include, but are not limited to, AM/FM radio, satellite radio, music, video movie and video game.

7. A system for capable of controlling display and operation of simultaneous play of at least two media, the system comprising:
(a) an entertainment unit linked to a display device and configured (1)(i) to display, on a display screen of the display device, a plurality of available and independently selectable media modes, and (ii) to display, on the display screen of the display device, one media selection of a media mode on one of a plurality of screen portions along with data information comprising at least one of a channel number, mode, headset status radio/satellite station, preset number, disc type, disc track/chapter, disc elapsed time, disc/satellite song title, artist, and/or album relating to the selected media, and another media selection of a media mode on another one of the plurality of screen portions along with data information comprising at least one of a channel number, mode, headset status, radio/satellite station, preset number, disc type, disc track/chapter, disc elapsed time, disc/satellite song title, artist, and/or album relating to the selected media, and (2) to simultaneously transmit a plurality of wireless signals with one of the wireless signals comprising media of the one media selection and another one of the wireless signals comprising media of the another media selection, and (3) to display a video on substantially the entire display screen where one of the media selections comprises a video mode media selection;
(b) a remotely operated wireless user interface device configured with onboard first and second media selection controls enabling independent selection of one of a plurality of media modes and a media selection for the selected media mode for each one of the first and second screen portions; and
(c) a plurality of wireless receivers with one of the wireless receivers receiving one of the plurality of wireless signals enabling at least playing of audio of the one media selection audibly to one person and another one of the wireless receivers simultaneously receiving the another one of the wireless signals enabling at least playing of audio of the another media selection audibly to another person.

8. The system as recited in claim 7, wherein the entertainment unit is configured where the plurality of available and independently selectable media modes is displayable on each one of the plurality of screen portions.

9. The system as recited in claim 7, wherein the wireless user interface device comprises a remote control and each one of the plurality of wireless receivers comprises a wireless headphone.

10. The system as recited in claim 9, wherein the entertainment unit further comprises a plurality of transceivers configured to transmit the plurality of wireless signals to the wireless headphones and to receive wireless control signals from the remote control.

11. The system as recited in claim 9, wherein each one of the first and second media selection controls are configured to enable selection between the one of the wireless signals comprising media of the one media selection and the another one of the wireless signals comprising media of the another media selection.

12. The system as recited in claim 11, wherein each one of the first and second media selection controls comprises a switch disposed onboard each one of the wireless headphones enabling selection, receipt and audible playback of a wireless signal of a selected one of the media selections.

13. A system for controlling display and operation of simultaneous play of at least two media, the system comprising:
(a) an entertainment unit linked to a display device and that is configured (1)(i) to display, on a display screen of the display device, a plurality of user selectable media modes, and (ii) to display, on the display screen of the display device, one media selection of a media mode on one of a plurality of screen portions that includes a first descriptor descriptive of media type and a second descriptor descriptive of media content and another media selection of a media mode on another one of the plurality of screen portions that includes a first descriptor descriptive of media type and a second descriptor descriptive of media content, (2) to simultaneously transmit a plurality of wireless signals with one of the wireless signals comprising media of the one media selection and another one of the wireless signals comprising media of the another media selection, and (3) to display a video on substantially the entire screen where one of the media selections comprises a video mode media selection;
(b) a remote control configured to wirelessly communicate with the entertainment unit and configured to (1) enable user selection of one of a plurality of media modes, (2) enable user media selection for the selected media mode for each one of the first and second screen portions, and (3) enable user control operation of each one of the media selections; and
(c) a plurality of headphones wirelessly linked to the entertainment unit with one of the wireless headphones receiving one of the plurality of wireless signals enabling play of audio of the one media selection for a user wearing the one of the wireless headphones and another one of the wireless headphones receiving another one of the plurality of wireless signals enabling play of audio of the one media selection for another user wearing the another one of the wireless headphones.

* * * * *